United States Patent [19]

Pazzaglia

[11] Patent Number: 4,714,816
[45] Date of Patent: Dec. 22, 1987

[54] MONITORING FACILITY FOR ELECTRIC WELDING EQUIPMENT, IN PARTICULAR AS USED FOR METAL BOX MANUFACTURE

[75] Inventor: Luigi Pazzaglia, Bologna, Italy

[73] Assignee: Cefin S.p.A., Bologna, Italy

[21] Appl. No.: 62,205

[22] Filed: Jun. 15, 1987

[51] Int. Cl.[4] .............................................. B23K 11/24
[52] U.S. Cl. ...................................... 219/109; 219/81
[58] Field of Search ......................... 219/109, 110, 81

[56] References Cited

U.S. PATENT DOCUMENTS 2,486,552 11/1949 Callender .............................. 219/110
2,508,330 5/1950 Callender et al. .................... 219/110
4,376,884 3/1983 Gold et al. ............................ 219/109

Primary Examiner—Clifford C. Shaw
Attorney, Agent, or Firm—Balogh, Osann, Kramer, Dvorak, Genova & Traub

[57] ABSTRACT

The invention relates to the art field of resistance welding utilizing rollers in conjunction with a continuous copper wire electrode and effected with welding current that remains constant on average, at least within each half-period. According to the invention, the weld between members (generally tinned metal strip) can be monitored by measuring the current that flows through the circuit created by the electrode wire, this being a function of the welding resistance that registers between the welding rollers; the value of the current thus measured is compensated in respect of the inductive effects produced by the magnetic field originating from the welding current, and relayed in digital form to a microprocessor that compares it with given maximum and minimum limits within which the reading must fall for quality of the weld to be assured.

7 Claims, 5 Drawing Figures

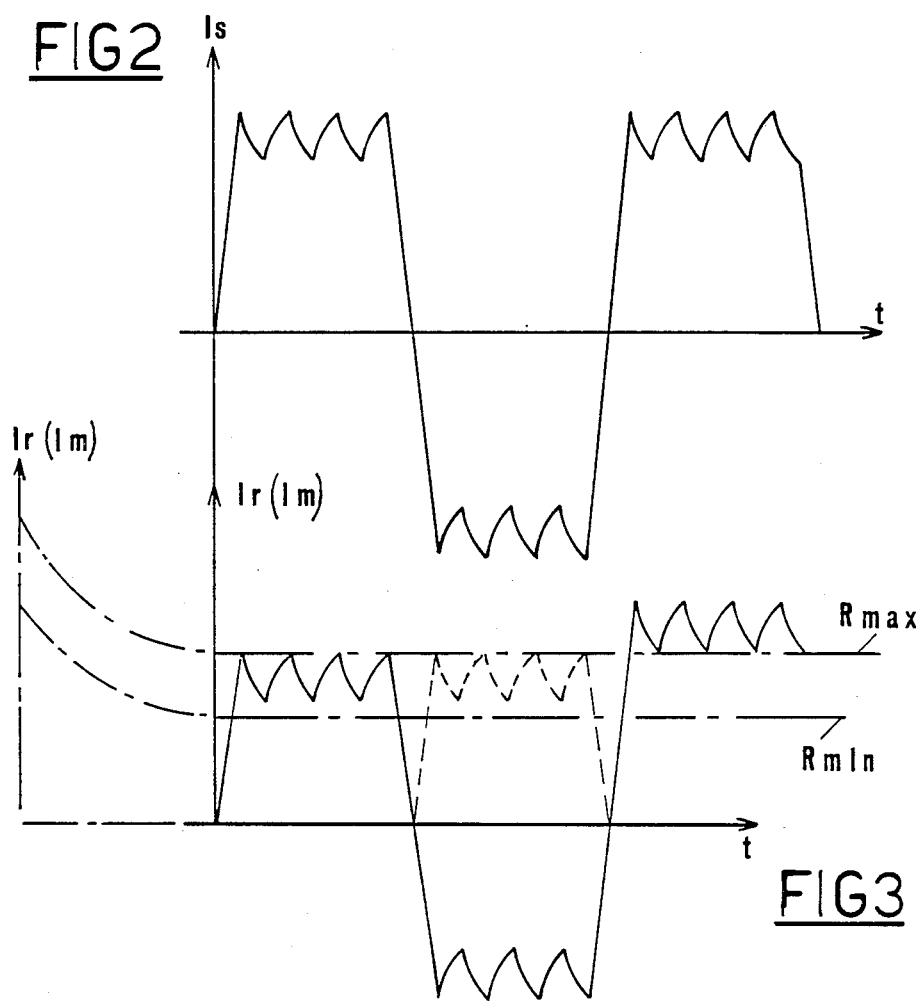
FIG 2
FIG 3
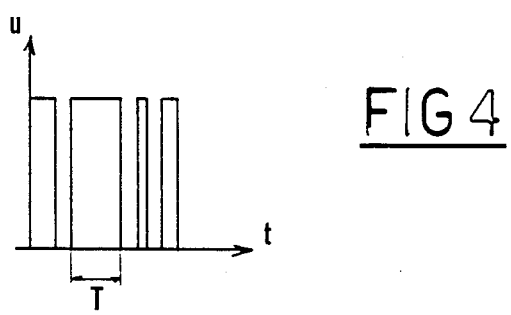
FIG 4

MONITORING FACILITY FOR ELECTRIC WELDING EQUIPMENT, IN PARTICULAR AS USED FOR METAL BOX MANUFACTURE

BACKGROUND OF THE INVENTION

The invention disclosed relates to a facility for monitoring electric welding operations, in particular those effected on metal box members, employing equipment of the type in which the welding rollers operate in conjuction with a continuous electrode wire looped around guide rollers and fed at a rate matching the surface speed of the welding rollers.

In equipment of the type, the electrode wire creates an external circuit in parallel to the work located between the rollers, which is in receipt of a welding current deriving from the pulsed output voltage supplied by a converter and flowing substantially constant, at least within each half-period.

According to the invention, welding equipment of this general type is provided with a monitoring facility incorporating a microprocessor system that serves to detect defects in the single weldments, hence in the entire metal box, and enable subsequent rejection of sub-standard items.

In the art field of resistance welding, as related in particular to the joining of metal box members, use is normally made of equipment designed to supply a non-constant welding current to the rollers; sine wave welding current, for example, might be adopted.

A first method of monitoring the weld produced along the joined edges of metal box members involves attaching a piezoelectric device to either one of the welding rollers (conventionally the top roller), which picks up any oscillation to which the roller itself may become subject during welding. Clearly, the roller may deviate to a greater or lesser degree from its initial level of contact with the work, according to the temperature generated in and around the work.

By prescribing maximum and minimum degrees of shift for the welding roller fitted with the piezoelectric device in relation to the remaining roller, within which the weld can be considered free of defects, one is provided with a first method of monitoring the accuracy of a finished weld in the face of variations in welding current. Needless to say, a method of this type is bound to be influenced by mechanical factors during operation of the welding equipment, and it is therefore a strictly indirect relationship that exists between oscillation of the roller associated with the piezoelectric device, and quality of the weld.

In a second method, likewise adopted for equipment of the type supplying non-constant current to the welding rollers, it is the welding current itself that is monitored. By measuring the welding current, and adopting set parameters that correspond to the limits of intensity within which it can be safely assumed that the weld is good, it becomes possible to establish whether or not the weld falls within prescribed margins of quality.

In both the first and the second method outlined above, use is made of monitoring facilities designed to operate to prescribed parametric limits within which oscillation, of the welding roller associated with the piezoelectric device in the first instance, of the welding current in the second instance, must register. Such monitoring facilities will generally incorporate microprocessor systems that are able to detect and recognize welding defects in the single boxes, and accordingly, to relay control signals to a knock-out device by which any sub-standard boxes are ejected.

In the second method mentioned above, in particular, measurement of the oscillations in welding current (the welding voltage remains substantially constant) gives rise to the problem that high speed operation of the welding equipment necessarily dictates working with high welding current frequencies. It therefore happens that frequencies of this order produce inductive reactance much higher than the resistance of the welding circuit, which in effect is the parameter used for monitoring purposes. This means that the discernable variations in welding current are small, given that its essential component is substantially inductive.

This much said, it should also be noted that the constant current operating characteristic is being increasingly adopted for resistance welding; in this instance, "constant" signifies that pulsed welding current remains constant on average, at least within each half-period.

Equipment operating in this fashion is favored by virtue of its appreciable advantages over the other types mentioned above.

With constant current type equipment, commonplace quality problems (breaks occurring in the weld) can be almost totally eliminated, and operating tempos can be obtained that were hitherto impossible. Using equipment of this kind however, which operates at substantially constant current, no possibility exists of using the monitoring facilities described above.

Accordingly, the object of the invention is to provide a monitoring facility for electric welding equipment, in particular as employed for metal box manufacture, of the type wherein welding current is constant to all practical intents and purposes.

Another object of the invention is to eliminate those drawbacks which beset the monitoring systems described above, and to afford a type of control directly and closely linked to the welding process, inasmuch as the parameter adopted is the resistance created between the welding rollers during welding. According to the invention, it is the variation in such resistance that constitutes the fundamental parameter in verifying the quality of the weld.

SUMMARY OF THE INVENTION

The stated objects are realized with a monitoring facility as disclosed and claimed herein, which is designed for use in resistance welding operations of the type wherein welding current remains substantially constant, and as such, cannot be exploited as a parameter by means of which to verify quality of the weld.

The essential advantage of the invention is that it affords maximum certainty of correct measurement, by virtue of the fact that the quantity monitored (in effect, directly) is welding resistance, a parameter which in turn directly reflects the condition of the material being welded.

Another great advantage of the monitoring facility according to the invention stems from the fact that it is simple and dependable in the extreme, and can be integrated into existing equipment with ease, and without any modification being necessary, utilizing a conventional monitoring medium with the addition of a suitable microprocessor.

BRIEF DESCRIPTION OF THE DRAWINGS

A preferred embodiment of the invention will now be described in detail, by way of example, with the aid of the accompanying drawings, in which:

FIGS. 2 & 3 show the waveform of the welding current, and that of current localized at the electrode wires looped around the welding rollers;

FIG. 4 illustrates the waveform of the voltage output from a converter supplying power to the equipment.

DESCRIPTION OF THE PREFERRED EMBODIMENT

With reference to the drawings, resistance welding equipment comprises a power source consisting in a converter 9 and a transformer 8 by way of which voltage u is supplied to the welding rollers 1.

The welding current Is produced may be regarded as constant, inasmuch as it registers a constant mean value within each half-period (as illustrated by way of example in the graph of FIG. 2).

2 denotes a continuous electrode wire looped around the two welding rollers 1 and routed around additional guide rollers 16, which is fed through at a speed matching the surface speed of the welding rollers.

Figure 1:
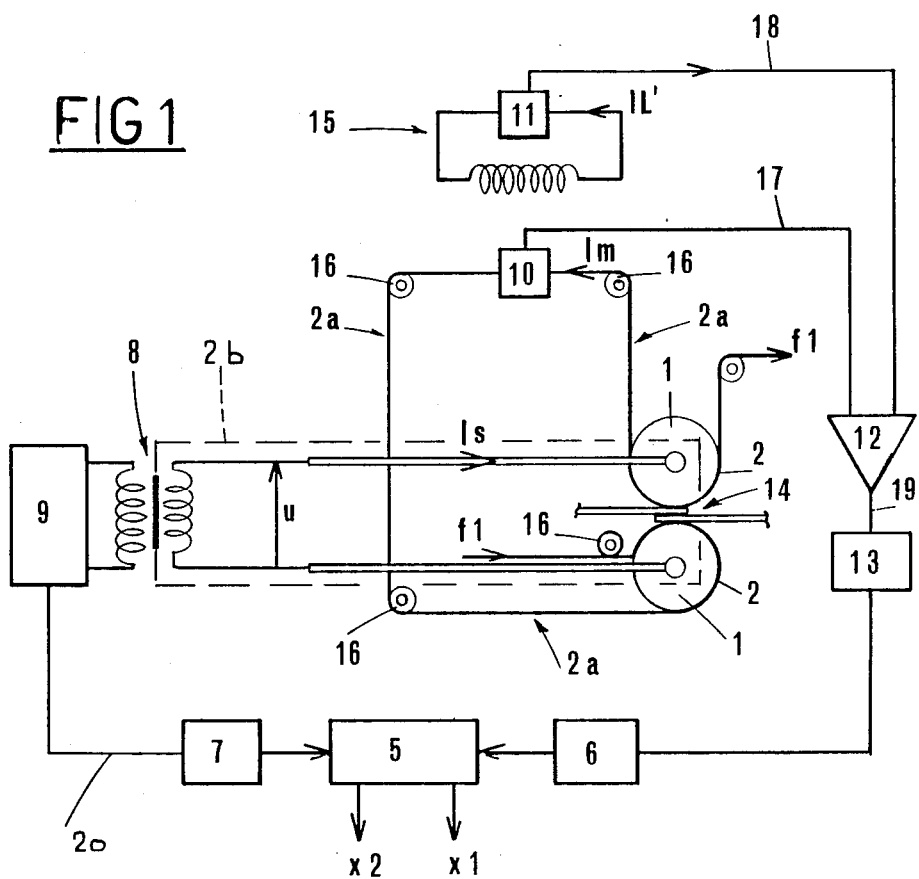
FIG. 1 is a diagram illustrating the operation of welding equipment according to the invention.
Figure 5:
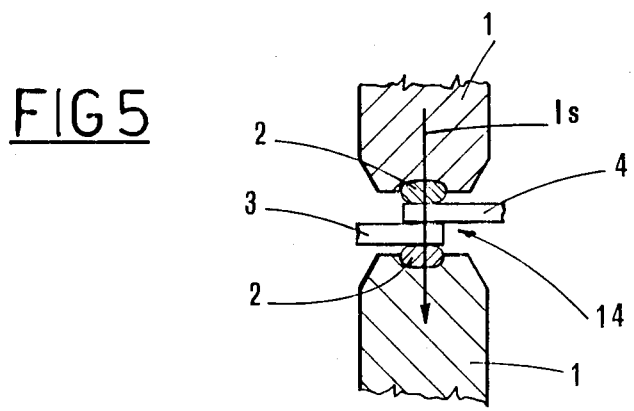
FIG. 5 is a detail of FIG. 1.

As FIG. 1 plainly illustrates, the electrode wire 2 creates a ciruit 2a externally of and in parallel with the weldment 14 located between the welding rollers 1. With specific reference to FIG. 1, and to FIG. 5 (a cross-sectional view of the welding rollers affording a clear illustration of the weldment 14), it will be appreciated that the resistance created in the weldment 14 is a variable factor determined by the nature of the material to be welded (e.g. the members 3 and 4 of a metal box), by the mechanical pressure exerted on the material, by the geometry of the weldment, by the overlap of the two members, and by the chemical substances present on the material (e.g. tinning etc.).

The continuous electrode wire 2 must be adopted when welding tinned metal box members, in order to keep the welding rollers clean; in such applications, a copper electrode wire 2 is run continuously between and around the welding rollers, fed in the direction of the arrow denoted f1 in FIG. 1. Welding current Is passing through the weldment 14 remains substantially constant, as aforementioned, as does the time lapse during which welding occurs; the only parameter subject to variation is resistance Rs, and it is this quantity that is monitored to the end of verifying quality of the weld.

It should be pointed out at this juncture, that the voltage u supplied to the welder, shown in FIG. 4, is normally pulsed. The option also exists of producing a substantially constant welding current using a voltage output that remains pulsed, but in which the single pulses alternate from positive to negative in such a way as to produce current with alternating positive and negative peaks, subsequently rectified so as to generate the substantially constant welding current mentioned above. In either case, the width of each voltage pulse must not be allowed to extend beyond a given duration, since the welding machine can suffer damage due to excessive build-up of heat.

The equipment as described thus far is prior art.

In equipment according to the invention, use is made of a first transducer 10, a Hall-effect device in a preferred embodiment, associated with the circuit 2a created by the electrode wire 2. Such a transducer is used to measure current Im flowing through the electrode circuit, which clearly is proportional to welding resistance Rs. The current Im in question comprises an inductive component however, which is a consequence of the magnetic field created in the electrode circuit 2a by the welding current Is, and must therefore be filtered out. More exactly, the current denoted Im may be thought of as consisting in an active component Ir, and a reactive component IL set up by the magnetic field; accordingly, it is the reactive component that must be filtered out and compensated in order to obtain a correct reading. This is achieved utilizing a second transducer 11, likewise a Hall-effect device, applied to a separate and exclusively inductive circuit 15 located within the magnetic field generated by the welding current. In the example illustrated, the separate inductive circuit is embodied as a coil wired in short circuit to the transducer 11, and current flowing through it, denoted IL', is proportional to the inductive component IL of the electrode current Im measured by the first transducer 10.

The first and second transducers 10 and 11 furnish output signals, denoted 17 and 18 respectively, that are proportional to the current Im and IL' measured in each instance; the two signals are cascaded into a filter 12 (a differential circuit in the example illustrated) that serves to eliminate the inductive component IL registering in the current Im measured by the first transducer 10, by subtracting the value of the inductive current IL' measured via the second transducer 11. The filter 12 thus provides an output signal 19 that is directly proportional to welding resistance Rs.

5 denotes a microprocessor that constitutes the main component of the weld monitoring facility according to the invention. Predetermined factors such as the mechanical pressure on the welding rollers, welding current Is, contact area or overlap between members of the weldment, the time lapse in which welding occurs, and the type of material to be welded, are not acknowledged in direct fashion by the MCP, but serve nonetheless in establishing the maximum and minimum parametric limits between which the welding resistance Rs, or rather, the current Im flowing through the electrode circuit 2a, must register (active current Ir being directly proportional to resistance Rs).

Accordingly, the microprocessor 5 performs the sole function of comparing the filtered signal 19 with the maximum and minimum parametric limits entered, that is, limits within which the signal 19 must fall for a faultless weld to be assumed.

Likewise entered in the MCP will be a limit reflecting the maximum permissible duration T (see FIG. 4) of each voltage pulse u, in order to prevent damage to the equipment through overheating.

Further to this aspect of operation, and referring to FIGS. 2 and 3, the welding current Is exhibits a substantially constant waveform as in FIG. 2 (i.e. current Is remains constant for practical purposes during each half-period), whereas current denoted Ir (the active component of current Im) is similarly constant in waveform, but varies in intensity in proportion to welding resistance Rs. Thus, where upper and lower parametric limits are established for the welding resistance Rs (Rs max and Rs min), and current Ir registers within such limits, then the weld is good; where current Ir registers either above or below the upper and lower limits, the weld is sub-standard and the box must be knocked out.

Where two parametric limits only are entered at the microprocessor 5, it becomes advantageous to cascade the output signal 19 from the filter circuit 12 into a rectifier 13, from where it is relayed to the microprocessor through an interface 6 that serves to digitalize the information. The same applies in the case of the supply voltage u, which is sampled and relayed to the microprocessor 5 by way of a further interface 7.

20 denotes the circuit by which the converter 9 is connected to the microprocessor 5, which serves to detect any variation in a given time constant applied to the ohmic-and-inductive welding circuit powered by the transformer 8, which is denoted 2b and encompassed by the phantom line in FIG. 1; such a variation is in fact directly proportional to any variation in the power output voltage u sampled from the converter 9.

Thus, the microprocessor 5 signals a substandard weld by way of two outputs x1 and x2 that are gated whenever current Ir registers outside the parametric limits entered, and whenever pulse width of the voltage u registers in excess of T, respectively.

The signal denoted x2 may also serve as a control function serving to prevent damage to the welding equipment by triggering a complete shut-off.

Finally, it will be observed that the welding resistance varies with temperature; accordingly, the cooler condition of the electrode wire 2 at the start of each welding cycle will dictate an overall welding resistance Rs lower than that which registers during normal operation, all other factors remaining equal. Similarly, current Im flowing through the electrode circuit 2a initially, and for a given transition period thereafter, will tend to register higher than under normal running conditions. Thus, considered graphically, current Ir(Im) will follow a decreasing exponential curve at first, thereafter remaining substantially constant unless conditions arise that reflect a sub-standard weld. The parametric limits entered in the microprocessor 5 must take account of this contingency, and the limits will therefore be plotted to initially decreasing exponential curves within which the intensity of the current Ir(Im) must register during the transition period (FIG. 3).

What is claimed:

1. Monitoring facility for electric welding equipment, in particular as used for metal box manufacture, comprising:
    welding rollers that operate in conjuction with a continuous electrode wire looped around guide rollers, fed at a rate matching the surface speed of the welding rollers, and creating an external circuit in parallel to the weldment located between the rollers, which is in receipt of a welding current deriving from the pulsed output voltage supplied by a converter and flowing substantially constant, at least within each half-period;
    a first transducer applied to the circuit created by the electrode wire, serving to measure current flowing in the electrode circuit, which consists in an active component directly proportional to resistance at the weldment and a reactive component deriving from the magnetic field generated by the welding current, and to supply an output signal proportional to the electrode current measured;
    a second transducer applied to a separate and exclusively inductive circuit within the magnetic field generated by the welding current, serving to measure the current flowing in the inductive circuit, which is proportional to the inductive component of the current measured by the first transducer, and to supply an output signal proportional to the current measured;
    a filter circuit into which the first and the second transducer are cascaded, serving to eliminate the inductive component from the current measured by the first transducer, by subtracting from it the value of the inductive current measured by the second transducer, and to supply an output signal directly proportional to welding resistance;
    means by which to verify quality of the single weldments, hence of the entire metal box, and enable subsequent rejection of sub-standard items, incorporating a microprocessor, to which the output signal from the filter circuit is supplied in digital form, that is in possession at least of the maximum and minimum parametric limits within which the filtered output signal must fall to ensure acceptable quality of the weld, and supplies a first output signal reflecting a sub-standard weld only when the signal received from the filter circuit fails to register within the prescribed parametric limits.

2. Monitoring facility as in claim 1, comprising a circuit serving to connect the converter with the microprocessor and provide a means by which to detect variation in a given time constant applied to the ohmic-and-inductive welding circuit powered by the transformer, wherein any such variation in time is directly proportional to a variation in pulse width of the power output voltage sampled from the converter, and wherein the microprocessor supplies a second output signal reflecting a sub-standard weld whenever voltage pulse width registers above a given parametric limit that is proportional to welding resistance, hence to quality of the weld.

3. Monitoring facility as in claim 2, wherein the second output signal from the microprocessor also serves as a control medium that prevents damage to the welding equipment by triggering shut-off.

4. Monitoring facility as in claim 1, wherein the first and second transducers are both Hall-effect devices.

5. Monitoring facility as in claim 1, wherein the filter circuit is a differential circuit.

6. Monitoring facility as in claim 1, wherein the separate inductive circuit is embodied as a coil connected in short circuit.

7. Monitoring facility as in claim 3, wherein the output from the differential circuit is cascaded into a rectifier.

* * * * *